Oct. 13, 1970 R. PROCHNOW 3,534,182

MAGNETIC RECORDING AND ERASING APPARATUS

Filed Dec. 21, 1967

Inventor:
Rudolf Prochnow
by [signature]
His Attorney.

3,534,182

MAGNETIC RECORDING AND ERASING APPARATUS

Rudolf Prochnow, Darmstadt-Eberstadt, Germany, assignor to Fernseh GmbH, Am Alten Bahnhof, Germany, a corporation of Germany Filed Dec. 21, 1967, Ser. No. 692,352
Claims priority, application Germany, Dec. 31, 1966, F 51,132
Int. Cl. G11b *5/48, 15/62*
U.S. Cl. 179—100.2 6 Claims

ABSTRACT OF THE DISCLOSURE

A guide block for a recording tape is disposed adjacent a rotating head wheel periphery, and has an arcuate guide surface that is curved to the curvature of that periphery and that is provided with one or more cavities to be tied to a vacuum source to bias a thru-travelling tape to the curved surface to have the same transverse curvature at said periphery which is the locus of the rotating recording heads.

An erasing magnet is disposed axially adjacent the guide block, and has an arcuate surface co-extensive with the arcuate surface of the guide block to provide a substantially continuous arcuate guide surface for a longitudinally travelling tape. The erasing magnet is formed to have an arcuate air gap in that arcuate surface, and the fringing flux from that air gap transversely engages the rear surface of the travelling tape passing the erasing magnet.

An auxiliary arcuate magnetizable guide sheet is supported slightly radially spaced from the arcuate surface of the erasing magnet, to provide passage space for the tape. The guide sheet spans the air gap to also serve as an auxiliary armature for the fringing air gap flux, to prevent that fringing air gap flux from travelling to the locus of the rotating recording heads and modulating the flux fields of those rotating heads.

In addition, such auxiliary armature pulls the erasing flux through the tape to the front of the tape, thus permitting the gap and the magnet to be positioned behind the tape, to provide an optimum design structure, by placing the erasing head in line with the guide block behind the advancing tape.

The invention relates to magnetic recording and erasing apparatus, and particularly to an arrangement for erasing a magnetic recording on a magnetic tape, while the tape is bent transversely, about a part of the peripheral path of a rotating head wheel, by tape guide means.

The magnetic recording may consist of television signals which are inscribed by several heads, for example, four, arranged at equal angular spacings on the periphery of the rotating head wheel. The recordings are made in transverse tracks on the magnetic tape. In addition thereto, the magnetic recording may contain sound or control signals which are recorded in longitudinal tracks of the magnetic tape along its edge.

For erasing the above mentioned magnetic recordings on a magnetic tape, it is conventional to provide an erasing head with a straight working gap, extending over the entire width of the magnetic tape. This has, for constructional reasons, a relatively large distance of, say, 230 millimetres, from the path of the rotating magnetic heads. With a tape velocity of, for example, 40 cm./sec., this corresponds to a conventional tape running time between the track of the rotating magnetic heads and the working gap of the erasing head of somewhat more than half a second. This is a drawback, especially in the case of electronic cutting and editing of magnetic tapes, because the switching over from one scene to another must be initiated earlier by the amount of time specified above. This time delay during the electronic cut must be taken into consideration and must be adhered to very accurately, and this requires comparatively expensive counting circuits. However, in many cases it is desirable to carry out the electronic cuts with a higher degree accuracy of, e.g., $+1/10$ of a second.

One object of this invention is to provide a construction of recording apparatus in which an erasing head may be disposed relatively closely to the operating path of the recording heads.

An arrangement is shown herein for erasing a magnetic recording on a magnetic tape, which is held bent about a part of the periphery of a rotating band wheel by means of a tape guide in the transverse direction of the tape. The erasing head is arranged, according to the invention, immediately adjacent to the head wheel and has, as seen in the direction of advance of the magnetic tape, a working gap, disposed to be parallel to the track of the magnetic recording heads, supported on the periphery of the head wheel, on the curvature of the magnetic tape.

A particularly small distance between the tracks of the magnetic heads and the working gap of the erasing head is achieved, in that the erasing head is combined structurally with the tape guide so that the erasure of the recording can be effected from the rear or the reverse side of the magnetic tape.

Another object of the invention is to provide a recording apparatus wherein erasing of a recording can be effected from the rear or reverse side of the magnetic tape.

Another object of the invention is to provide a recording apparatus with an erasing head closely mechanically coupled to the recording head structure, but arranged with magnetic shielding to prevent electro-magnetic interaction between the erasing head magnetic flux field and the operating flux fields of the recording heads.

In order to ensure the intimate contact between the erasing head and the magnetic tape over the full width of the tape, there may be provided in the tape guide upstream of the erasing head, in the immediate vicinity of the working or recording head gap, a slot in the face of the tape guide body, which is provided with a vacuum, by connection to a vacuum source, so that the magnetic tape is pressed by the external air pressure against the tape guide body for producing in part a good contact between the magnetic tape and the erasing head.

In order to prevent any interference with the recording process by the magnetic field of the erasing head, there is provided, between the air gap of the erasing head and the track of the magnetic heads, a curved ferromagnetic screen on and near the coated side of the tape, to span the erasing gap and extend between the erasing gap and the locus of the recording heads.

The erasing head may also be arranged with a convex surface immediately adjacent to the head wheel so that such erasing head would brush the magnetic tape on its coated side. However, the construction with a concave head surface is preferable, as provided herein, because here the production of a good contact between tape and head by means of suction air is simpler, and the screening, as herein, between the magnetic fields of the erasing head and the magnetic bends on the rotating head wheel may be constructed more efficiently.

With the above and other objects of the invention in view, the invention consists in the novel construction, arrangement and combination of various devices, elements and parts, as set forth in the claims hereof, certain embodiments of the same being illustrated in the accompanying drawings and described in the specification.

For a fuller understanding of the nature and objects of the invention, reference should be had to the following detailed description, taken in connection with the accompanying drawings, in which.

Corresponding parts in both figures are designated by the same reference numerals.

Figure 1:
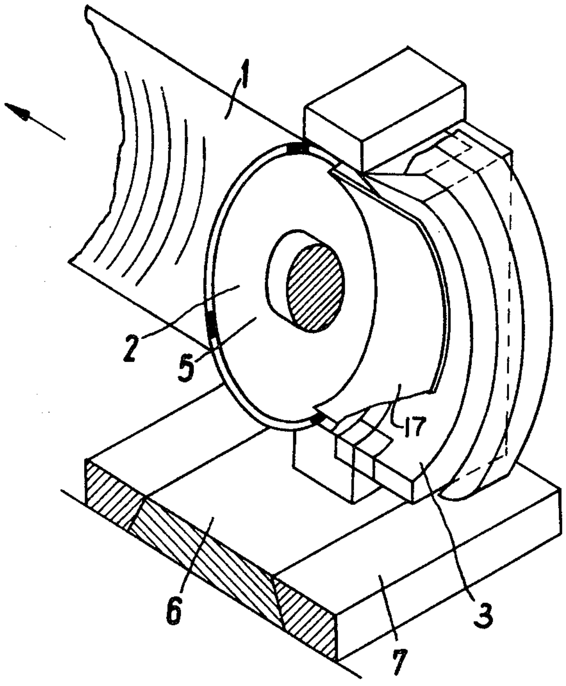
FIG. 1 shows a head-wheel unit, containing only the parts necessary for explaining the invention, shown in perspective.

In FIG. 1, reference numeral 1 designates the magnetic tape, moving in the direction of the arrow past the rotating head-wheel 2, and arcuately bent and shaped by the tape guide block 3 over a part of the periphery of the head wheel 2, to the locus of the tracks of the magnetic heads. The periphery of the head-wheel has fitted thereto four magnetic heads in equal angular spacing, of which the drawing shows three heads, one being hidden. The tape guide block 3 is adapted to be adjustably movable perpendicularly to the axis 5 of the bent wheel, in order to enable the magnetic tape to be fitted to the recording head locus. To this end, the tape guide 3 is mounted on a carriage 6 which slides in the guide 7 and makes possible in this manner a displacement of the tape guide 3 parallel to itself, for adjustment to the wheel head periphery.

Figure 2:
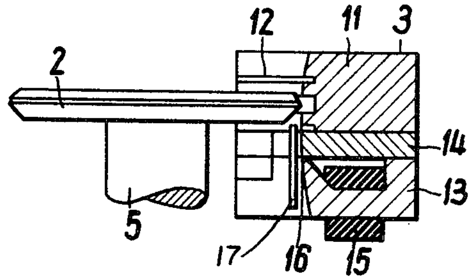
FIG. 2 shows a cross-section through the tape guide on FIG. 1, along a plane passing through the axis of the head-wheel.

The tape guide block 3 (FIG. 2) is equipped in the region of the head-wheel 2 with slots 11, 12, which are coupled to a suitable vacuum source, so that the magnetic tape is pressed by the pressure of the ambient air against the concave surface of the tape guide block 3, and the tape, being resilient and flexible, can slightly give under the contact pressure of the points of the magnetic head.

The erasing head consists of a ferromagnetic yoke, which consists of two parts 13 and 14. The part 13 carries a coil 15 which is supplied with the erasing current. Between the concave surfaces of the yoke members 13 and 14, which rest on the rear side of the magnetic tape, there is a curved air gap 16, in which the erasing field is formed which acts, through the tape, on the magnetic layer of the magnetic tape and erases the recording thereon.

An arcuate magnetizable shield 17 is supported uniformly slightly spaced from the front arcuate surface of the magnetic yoke structure of the erasing magnet, to provide an arcuate narrow space to permit conformably free passage of a tape, longitudinally past the erasing head during operation.

The magnetizable shield 17 serves several functions. First, it serves the mechanical function of transversely curving a tape to cause the tape to assume a proper curvature corresponding to the locus of the rotating heads, as the tape is moved into position at and past the erasing head. Second the shield serves a second mechanical function in that it holds the tape to efficient engagement with the erasing head, and especially to close spacing at the air gap, for efficient action of the erasing flux field.

Thus, the shield 17 serves an electromagnetic function as an auxiliary armature for the fringing flux from the air gap, both to pull the flux field to the front of the tape for the erasing action, and also to concentrate such pulled-forward flux field for efficient erasing action.

Further, as a fourth function, the shield 17 serves a particularly important electromagnetic function as a magnetic shield and barrier, to prevent the high-frequency fringing flux of the erasing air gap from moving as a near or far antenna field, to reach a recording head and modulate the recording flux field of such recording head. Thus the shield serves as a flux suppressing field barrier, effective beyond the tape magnetic layer, so the erasing field may extend outwards through the tape and to the magnetic powder layer, but not beyond that layer as a barrier.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A recording apparatus for recording transverse tracks on an elongated magnetic tape, comprising a rotatable head-wheel supporting a plurality of recording heads on the periphery of said wheel and serving to rotate said heads in a corresponding circular peripheral path in a plane transverse to the axis of rotation;

means for axially moving an elongated tape of constant width past said head-wheel;

means adjacent an arcuate portion of the circular locus of the peripheral path of said heads for temporarily imparting a corresponding arcuate shape transversely to said elongated tape as said tape is passing through said arcuate portion of said peripheral path;

and an erasing head positioned axially displaced from said plane of rotation of said recording head-wheel; and operative to erase any prior recording on said tape, said erasing head has a magnetic first pole piece, a winding, and a second pole piece spaced from said first pole piece to define a flux air gap adjacent the path of movement of a tape during its longitudinal forward movement past the erasing head and through said peripheral path of the rotating recording heads, said flux-producing air gap of said erasing head is defined along an arcuate locus corresponding substantially to the desired transverse curvature of a tape to be acted in by the erasing head as the tape moves past said erasing head.

2. A recording apparatus, as in claim 1, including a guide sheet spaced from said erasing head and flux gap, to define with said erasing head an arcuate space as a guiding passageway for a travelling tape, and to impart to such tape a transverse arcuate form substantially as desired for its movement past the rotating head-wheel.

3. A recording apparatus, as in claim 2, in which:

said guide sheet is of magnetizable material to serve as an auxiliary pole piece for said erasing air gap of said erasing head, and thereby to limit and serve as a magnetic barrier against magnetic interaction with, and modulation of, the magnetic recording fields of the recording heads on said rotating head-wheel.

4. A recording apparatus for recording transverse tracks on an elongated magnetic tape, comprising a rotatable head-wheel supporting a plurality of recording heads on the periphery of said wheel and serving to rotate said heads in a corresponding circular peripheral path in a plane transverse to the axis of rotation;

means for axially moving an elongated tape of constant width past said head-wheel;

means adjacent an arcuate portion of the circular locus of the peripheral path of said heads for temporarily imparting a corresponding arcuate shape transversely to said elongated tape as said tape is passing through said arcuate portion of said peripheral path;

and an erasing head positioned axially displaced from said plane of rotation of said recording head-wheel; and operative to erase any prior recording on said tape, said erasing head has a magnetic first pole piece, a winding, and a second pole piece spaced from said first pole piece to define a flux air gap adjacent the path of movement of a tape during its longitudinal forward movement past the erasing head and through said peripheral path of the rotating recording heads, said erasing flux air gap of said erasing head is positioned axially displaced from the plane of rotation of the rotating head, and a magnetizable sheet is disposed in closely spaced relation to said air gap to serve as a magnetic barrier against fringing field expansion or radiation from said air gap that would interact with and modulate a recording flux field from a recording head at the tape, said magnetizable sheet is arcuately curved and uniformly spaced from said flux air gap of said erasing head to provide a guide space for initially imparting transverse arcuate curvature to said tape as it moves progressively past the rotating recording head.

5. A recording apparatus, as in claim 4, in which:

said magnetizable sheet in its curvature is sufficiently close to said erasing air gap to serve as an auxiliary pole piece for the erasing field flux and to thereby provide a low reluctance path to increase the efficiency of the erasing field action at said air gap.

6. A recording apparatus for recording transverse tracks on an elongated magnetic tape, comprising a rotatable head-wheel supporting a plurality of recording heads on the periphery of said wheel and serving to rotate said heads in a corresponding circular peripheral path in a plane transverse to the axis of rotation;

means for axially moving an elongated tape of constant with past said head-wheel;

means adjacent an arcuate portion of the circular locus of the peripheral path of said heads for temporarily imparting a corresponding arcuate shape transversely to said elongated tape as said tape is passing through said arcuate portion of said peripheral path;

and an erasing head positioned axially displaced from said plane of rotation of said recording head-wheel; and said erasing head has a magnetic first pole piece, a winding, and a second pole piece spaced from said first pole piece to define a flux air gap adjacent the path of movement of a tape during its longitudinal forward movement past the erasing head and through said peripheral path of the rotating recording heads, said rotating head wheel rotates the recording heads into engagement with the front surface of a travelling tape;

and said erasing head is disposed to engage the rear surface of said travelling tape;

and a magnetizable element is disposed to engage the front surface of the tape in the field of the erasing magnetic flux gap to induce the erasing flux field to move to the front surface of the travelling tape to be there effective.

References Cited

UNITED STATES PATENTS

| | | | |
|---|---|---|---|
| 3,180,930 | 4/1965 | Bounsall | 179—100.2 |
| 3,372,241 | 3/1968 | Dziekan et al. | 179—100.2 |

OTHER REFERENCES

Ambrico, L. E., "Unbiased Erasure," IBM Technical Disclosure Bulletin, vol. 9, No. 7, December 1966.

JAMES W. MOFFITT, Primary Examiner

W. F. WHITE, Assistant Examiner

U.S. Cl. X.R.

178—6.6; 340—174.1; 346—74